United States Patent
Best et al.

(10) Patent No.: US 12,054,579 B2
(45) Date of Patent: *Aug. 6, 2024

(54) POLYISOCYANATE RESINS

(71) Applicant: Covestro LLC, Pittsburgh, PA (US)

(72) Inventors: Kurt E. Best, Wexford, PA (US); Daniel P. Wang, Pittsburgh, PA (US); Joseph Kleer, Crescent, PA (US)

(73) Assignee: COVESTRO LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,691

(22) Filed: Jun. 20, 2023

(65) Prior Publication Data

US 2023/0331901 A1    Oct. 19, 2023

Related U.S. Application Data

(63) Continuation of application No. 16/952,511, filed on Nov. 19, 2020, now Pat. No. 11,732,083.

(51) Int. Cl.
| | |
|---|---|
| C08G 18/72 | (2006.01) |
| B32B 27/28 | (2006.01) |
| C08G 18/12 | (2006.01) |
| C08G 18/28 | (2006.01) |
| C08G 18/50 | (2006.01) |
| C08G 18/73 | (2006.01) |
| C08G 18/75 | (2006.01) |
| C08G 18/78 | (2006.01) |
| C08L 75/02 | (2006.01) |
| C09D 175/02 | (2006.01) |
| C08G 18/34 | (2006.01) |
| C08G 18/42 | (2006.01) |

(52) U.S. Cl.
CPC .......... *C08G 18/755* (2013.01); *C08G 18/12* (2013.01); *C08G 18/5042* (2013.01); *C08G 18/73* (2013.01); *C08G 18/7825* (2013.01); *C09D 175/02* (2013.01)

(58) Field of Classification Search
None
See application file for complete search history.

(56) References Cited

U.S. PATENT DOCUMENTS

| | | | |
|---|---|---|---|
| 2,862,972 A | 12/1958 | Holtschmidt et al. |
| 3,005,803 A | 10/1961 | Holtschmidt et al. |
| 3,016,365 A | 1/1962 | Holtschmidt |
| 3,026,275 A | 3/1962 | Erwin et al. |
| 3,062,772 A | 11/1962 | Keplinger et al. |
| 3,377,296 A | 4/1968 | Dwyer et al. |
| 3,420,800 A | 1/1969 | Haggis |
| 3,631,138 A | 12/1971 | Peters |
| 4,146,509 A | 3/1979 | Markusch et al. |
| 4,186,257 A | 1/1980 | Blahak et al. |
| 4,217,381 A | 8/1980 | Asano |
| 4,228,249 A | 10/1980 | Blahak et al. |
| 4,310,373 A | 1/1982 | Schuhmacher et al. |
| 4,442,236 A | 4/1984 | Rasshofer et al. |
| 4,456,744 A | 6/1984 | Kamatani et al. |
| 4,471,103 A | 9/1984 | Miyake et al. |
| 4,672,100 A | 6/1987 | Schonbachler et al. |
| 4,724,256 A | 2/1988 | Starner et al. |
| 4,791,187 A | 12/1988 | Sueling et al. |
| 5,188,716 A | 2/1993 | Schwerzel et al. |
| 5,200,489 A | 4/1993 | Jacobs et al. |
| 5,281,654 A | 1/1994 | Eisenhart et al. |
| 5,608,000 A | 3/1997 | Duan et al. |
| 5,656,677 A | 8/1997 | Jourquin et al. |
| 6,410,638 B1 | 6/2002 | Kaufhold et al. |
| 6,713,570 B2 | 3/2004 | Tangen |
| 6,806,342 B2 | 10/2004 | Bleys et al. |
| 6,838,516 B2 | 1/2005 | Dai et al. |
| 7,262,255 B2 | 8/2007 | Winter et al. |
| 7,307,134 B2 | 12/2007 | Lim et al. |
| 7,345,109 B2 | 3/2008 | Schafheutle et al. |
| 7,943,682 B2 | 5/2011 | Wagner et al. |
| 8,440,779 B2 | 5/2013 | Audenaert et al. |
| 8,501,165 B2 | 8/2013 | Milbocker |
| 8,580,909 B2 | 11/2013 | Hansen |
| 8,602,504 B2 | 12/2013 | Xie |
| 8,653,221 B2 | 2/2014 | Schuemann |
| 8,747,605 B2 | 6/2014 | Lutz et al. |
| 8,765,900 B2 | 7/2014 | Best et al. |
| 8,802,771 B2 | 8/2014 | Argyropoulos |
| 9,050,388 B2 | 6/2015 | Milbocker |
| 9,339,583 B2 | 5/2016 | Milbocker |
| 9,365,739 B2 | 6/2016 | Dombrowski et al. |
| 9,676,887 B2 | 6/2017 | Lutz et al. |
| 10,508,215 B2 | 12/2019 | Steinmetz et al. |
| 11,732,083 B2 * | 8/2023 | Best ...................... C08G 18/12 525/452 |

(Continued)

FOREIGN PATENT DOCUMENTS

EP    3702386 A1    9/2020

*Primary Examiner* — Michael J Feely
(74) *Attorney, Agent, or Firm* — Richard P. Bender; Jed C. Benson

(57) ABSTRACT

A polyisocyanate resin can include from 25 wt % to 50 wt % of a first cycloaliphatic polyisocyanate and from 50 wt % to 75 wt % of a flexibilizing component based on a total weight of the polyisocyanate resin. The flexibilizing component can include a linear aliphatic polyisocyanate having a number average isocyanate functionality of from 2 to 3 based on gel permeation chromatography and an isocyanate-terminated reaction product of a second cycloaliphatic polyisocyanate and an isocyanate-reactive material, the reaction product having a Tg of less than −30° C. based on a Differential Scanning calorimetry ($2^{nd}$ Heating) temperature scan from −100° ° C. to 150° C. using 20° C./min heating and cooling ramps. The isocyanate-terminated reaction product and the linear aliphatic polyisocyanate can be present at a weight ratio of from 0.5 to 2.5.

20 Claims, No Drawings

(56) References Cited

U.S. PATENT DOCUMENTS

| | | |
|---|---|---|
| 2004/0019160 A1 | 1/2004 | Dai et al. |
| 2004/0068078 A1 | 4/2004 | Milbocker |
| 2005/0137323 A1 | 6/2005 | Roesler et al. |
| 2005/0222289 A1 | 10/2005 | Miller |
| 2006/0084777 A1 | 4/2006 | Bleys et al. |
| 2007/0004894 A1 | 1/2007 | Mazanek et al. |
| 2007/0083002 A1 | 4/2007 | Schafheutle et al. |
| 2007/0129525 A1 | 6/2007 | Eichelmann |
| 2007/0218209 A1 | 9/2007 | Asahina et al. |
| 2008/0171816 A1 | 7/2008 | Spyrou et al. |
| 2011/0281965 A1 | 11/2011 | Laas et al. |
| 2012/0245241 A1 | 9/2012 | Peiffer et al. |
| 2012/0245242 A1 | 9/2012 | Peiffer et al. |
| 2013/0172475 A1 | 7/2013 | Zhang et al. |
| 2015/0203705 A1 | 7/2015 | Olson et al. |
| 2019/0100675 A1 | 4/2019 | Zielinski et al. |
| 2020/0131414 A1 | 4/2020 | Grunder et al. |
| 2020/0199358 A1 | 6/2020 | Takagi et al. |

\* cited by examiner

POLYISOCYANATE RESINS

CROSS-REFERENCE TO RELATED APPLICATIONS

This application is a continuation of application U.S. Ser. No. 16/952,511, filed Nov. 19, 2020, which is incorporated herein by reference.

BACKGROUND

Compositions based on isocyanate chemistry find utility as components in coatings, such as, for example, paints, primers, and the like. Isocyanate-based coating compositions may include, for example, polyurethane or polyurea coatings formed from resins comprising components, such as, for example, diisocyanates, polyisocyanates, isocyanate reaction products, the like, or a combination thereof. These resins may cure by various mechanisms so that covalent bonds form between the resin components, thereby producing a cross-linked polymer network.

As non-limiting examples, some polyurethane and polyurea coatings can be used to formulate a variety of industrial maintenance and protective coatings. Such coatings can be formulated to provide protection to underlying substrates against corrosion, abrasion, and various other degradative stimuli. However, in some cases, as industrial maintenance and protective coatings age, they can experience changes in performance (e.g., flexibility, weatherability, etc.) and aesthetic appeal (e.g., color, gloss, etc.). As one example, some industrial maintenance and protective coatings can undergo color and/or gloss changes in a relatively short period of time. This can present challenges where "touch-up" work may be required because the refinished areas may look non-uniform as compared to surrounding areas, resulting in an aesthetically undesirable appearance. Thus, in many cases, it can be beneficial to formulate an industrial maintenance and protective coating that has good performance over time, and that also allows for aesthetically acceptable recoatability.

BRIEF SUMMARY

A polyisocyanate resin can include from 25 wt % to 50 wt % of a first cycloaliphatic polyisocyanate and from 50 wt % to 75 wt % of a flexibilizing component based on a total weight of the polyisocyanate resin. The flexibilizing component can include an isocyanate-terminated reaction product of a second cycloaliphatic polyisocyanate and an isocyanate-reactive material, the reaction product having a glass transition temperature (Tg) of less than −30° C. based on a Differential Scanning calorimetry ($2^{nd}$ Heating) temperature scan from −100° C. to 150° C. using 20° C./min heating and cooling ramps, and a linear aliphatic polyisocyanate having a number average isocyanate functionality of from 2 to 3 based on gel permeation chromatography, wherein the reaction product and the linear aliphatic polyisocyanate are present at a weight ratio of from 0.5 to 2.5.

A method of manufacturing a polyisocyanate resin can include combining a first cycloaliphatic polyisocyanate and a flexibilizing component at a weight ratio of from 0.3 to 1. The flexibilizing component can include a linear aliphatic polyisocyanate having a number average isocyanate functionality of from 2 to 3 based on gel permeation chromatography and an isocyanate-terminated reaction product of a second cycloaliphatic polyisocyanate and an isocyanate-reactive material. The isocyanate-terminated reaction product can have a glass transition temperature (Tg) of less than −30° C. based on a Differential Scanning calorimetry ($2^{nd}$ Heating) temperature scan from −100° ° C. to 150° C. using 20° C./min heating and cooling ramps. The isocyanate-terminated reaction product and the linear aliphatic polyisocyanate can be combined at a weight ratio of from 0.5 to 3.

DETAILED DESCRIPTION

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this written description, the singular forms "a," "an" and "the" include express support for plural referents unless the context clearly dictates otherwise. Thus, for example, reference to "a polymer" or "the polymer" can include a plurality of such polymers.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this written description it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 milligrams to about 80 milligrams" should also be understood to provide support for the range of "50 milligrams to 80 milligrams." Furthermore, it is to be understood that in this specification support for actual numerical values is provided even when the term "about" is used therewith. For example, the recitation of "about" 30 should be construed as not only providing support for values a little above and a little below 30, but also for the actual numerical value of 30 as well. Unless otherwise specified, all numerical parameters are to be understood as being prefaced and modified in all instances by the term "about," in which the numerical parameters possess the inherent variability characteristic of the underlying measurement techniques used to determine the numerical value of the parameter.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 to 5" should be interpreted to include not only the explicitly recited values of 1 to 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Corrosion-resistant coatings have found use on a number of infrastructure assets, such as bridges and municipal sports stadiums. However, some corrosion-resistant coatings have one or more challenges that limit their usefulness. For example, some corrosion-resistant coatings may not recoat well, resulting in recoated layers that do not adhere well to the underlying coating and easily peel off. In other cases, corrosion-resistant coatings may suffer from gloss loss over relatively short periods of time, resulting in patchy touch-up work that is not aesthetically desirable. In still additional cases, some corrosion-resistant coatings may have suitable performance for some infrastructure assets, but lack the flexibility for other markets that demand more flexible coatings.

The present disclosure describes polyisocyanate resins that can be used to formulate a coating composition having good recoatability and that provides a coating having low gloss loss and good flexibility. Specifically, the present disclosure describes a polyisocyanate resin including a first cycloaliphatic polyisocyanate combined with a flexibilizing component.

In further detail, the polyisocyanate resin described herein can include or be formed from a first cycloaliphatic polyisocyanate. Without wishing to be bound by theory, it is believed that incorporating a cycloaliphatic polyisocyanate into a polyisocyanate resin can impart good gloss stability to the resin. Thus, the polyisocyanate resin described herein can generally include at least 25 wt % of a first cycloaliphatic polyisocyanate to help maintain good gloss stability. In some additional examples, the first cycloaliphatic polyisocyanate can be included in a polyisocyanate resin in an amount of from 25 wt % to 50 wt % based on a total weight of the resin. In some specific examples, the first cycloaliphatic polyisocyanate can be included in a polyisocyanate resin in an amount of from 25 wt % to 35 wt %, or from 35 wt % to 45 wt % based on a total weight of the resin. In some additional specific examples, the first cycloaliphatic polyisocyanate can be included in a polyisocyanate resin in an amount of from 30 wt % to 40 wt %, or from 40 wt % to 50 wt % based on a total weight of the resin.

As used herein, the term "polyisocyanate" refers to compounds comprising at least two un-reacted isocyanate groups. The term "diisocyanate" refers to compounds having two un-reacted isocyanate groups. Thus, "diisocyanate" is a subset of "polyisocyanate." Polyisocyanates can include biurets, isocyanurates, uretdiones, isocyanate-functional urethanes, isocyanate-functional ureas, isocyanate-functional iminooxadiazine diones, isocyanate-functional oxadiazine diones, isocyanate-functional carbodiimides, isocyanate-functional acyl ureas, isocyanate-functional allophanates, the like, or combinations thereof.

As non-limiting examples, isocyanurates may be prepared by the cyclic trimerization of polyisocyanates. Trimerization may be performed, for example, by reacting three (3) equivalents of a polyisocyanate to produce 1 equivalent of isocyanurate ring. The three (3) equivalents of polyisocyanate may comprise three (3) equivalents of the same polyisocyanate compound, or various mixtures of two (2) or three (3) different polyisocyanate compounds. Compounds, such as, for example, phosphines, Mannich bases and tertiary amines, such as, for example, 1,4-diaza-bicyclo[2.2.2]octane, dialkyl piperazines, or the like, may be used as trimerization catalysts. Iminooxadiazines may be prepared by the asymmetric cyclic trimerization of polyisocyanates. Uretdiones may be prepared by the dimerization of a polyisocyanate. Allophanates may be prepared by the reaction of a polyisocyanate with a urethane. Biurets may be prepared via the addition of a small amount of water to two equivalents of polyisocyanate and reacting at slightly elevated temperature in the presence of a biuret catalyst. Biurets may also be prepared by the reaction of a polyisocyanate with a urea.

With this in mind, the first cycloaliphatic polyisocyanate can include or be formed from a variety of cycloaliphatic polyisocyanates. Non-limiting examples can include 1-isocyanato-3,3,5-trimethyl-5-isocyanato-methylcyclohexane (IPDI), 2,4-diisocyanato-dicyclohexyl-methane, 4,4' diisocyanato-dicyclohexyl-methane, 1-isocyanato-1-methyl-3 (4)-isocyanatomethyl-cyclohexane (IMCI), 1,4-cyclohexane diisocyanate (CHDI), the like, or a combination thereof. In some specific examples, the first cycloaliphatic polyisocyanate can include a secondary isocyanate group. By "secondary isocyanate group," it is meant an isocyanate group bonded to a secondary carbon atom.

In some further examples, the first cycloaliphatic polyisocyanate can be or include a biuret, a trimer, an allophanate, the like, or a combination thereof. For example, in some cases, the first cycloaliphatic polyisocyanate can be or include a trimer, such as a trimer of IPDI, a trimer of 2,4-diisocyanato-dicyclohexyl-methane, a trimer of 4,4' diisocyanato-dicyclohexyl-methane, a trimer of IMCI, a trimer of CHDI, or a combination thereof. In other examples, the first cycloaliphatic polyisocyanate can be or include a biuret, such as a biuret of IPDI, a biuret of 2,4-diisocyanato-dicyclohexyl-methane, a biuret of 4,4' diisocyanato-dicyclohexyl-methane, a biuret of IMCI, a biuret of CHDI, or a combination thereof. In still additional examples, the first cycloaliphatic polyisocyanate can be or include an allophanate, such as an allophanate of IPDI, an allophanate of 2,4-diisocyanato-dicyclohexyl-methane, an allophanate of 4,4' diisocyanato-dicyclohexyl-methane, an allophanate of IMCI, an allophanate of CHDI, or a combination thereof.

In some specific examples, the first cycloaliphatic polyisocyanate can be or include an IPDI polyisocyanate. Where this is the case, in some examples, the IPDI polyisocyanate can be or include an IPDI trimer, an IPDI allophanate, or a combination thereof. In some additional examples, the IPDI polyisocyanate can include an allophanate of an IPDI trimer. In some other examples, the IPDI polyisocyanate can include an IPDI trimer, but not an allophanate.

The first cycloaliphatic polyisocyanate can generally have an NCO % of from 12 wt % to 20 wt % based on ISO 11909:2007. In some additional examples, the first cycloaliphatic polyisocyanate can have an NCO % of from 12 wt % to 16 wt %, from 14 wt % to 18 wt %, or from 16 wt % to 20 wt % based on ISO 11909:2007.

In some examples, the first cycloaliphatic polyisocyanate can have a number average isocyanate functionality of from 2.4 to 3.8 based on gel permeation chromatography using polystyrene standards. In some additional examples, the first cycloaliphatic polyisocyanate can have a number average isocyanate functionality of from 2.4 to 3.0, from 2.8 to 3.4, or from 3.2 to 3.8 based on gel permeation chromatography using polystyrene standards.

While the first cycloaliphatic polyisocyanate may provide good gloss stability to the polyisocyanate resin, the resin may still lack sufficient flexibility for some applications without the addition of a flexibilizing component. Thus, in addition to the first cycloaliphatic polyisocyanate, the polyisocyanate resin described herein can also include a flexibilizing component. Generally, a flexibilizing component is included in the polyisocyanate resin in an amount of at least 50 wt % based on a total weight of the polyisocyanate resin. In some examples, a flexibilizing component can be included in the polyisocyanate resin in an amount of from 50 wt % to 75 wt % based on a total weight of the polyisocyanate resin. In some specific examples, the flexibilizing component can be included in the polyisocyanate resin in an amount of from 50 wt % to 60 wt %, from 55 wt % to 65 wt %, from 60 wt % to 70 wt %, or from 65 wt % to 75 wt % based on a total weight of the polyisocyanate resin.

In further detail, the flexibilizing component can include one or more polyisocyanate components that are suitable to increase the deformation resistance of the polyisocyanate resin, while helping to maintain good gloss stability. As such, the flexibilizing component can generally include one or more materials having a relatively low glass transition temperature (Tg).

In some examples, the flexibilizing component can be or include an isocyanate-terminated reaction product of a second cycloaliphatic polyisocyanate with an isocyanate-reactive material. The second cycloaliphatic polyisocyanate can independently be or include a cycloaliphatic aliphatic polyisocyanate described with respect to the first cycloaliphatic polyisocyanate. More specifically, the second cycloaliphatic polyisocyanate can include a variety of cycloaliphatic polyisocyanates. Non-limiting examples can include 1-isocyanato-3,3,5-trimethyl-5-isocyanato-methylcyclohexane (IPDI), 2,4-diisocyanato-dicyclohexyl-methane, 4,4' diisocyanato-dicyclohexyl-methane, 1-isocyanato-1-methyl-3 (4)-isocyanatomethyl-cyclohexane (IMCI), 1,4-cyclohexane diisocyanate (CHDI), the like, or a combination thereof. In some specific examples, the second cycloaliphatic polyisocyanate can include a secondary isocyanate group. By "secondary isocyanate group," it is meant an isocyanate group bonded to a secondary carbon atom.

In some further examples, the second cycloaliphatic polyisocyanate can be or include a biuret, a trimer, an allophanate, the like, or a combination thereof. For example, in some cases, the second cycloaliphatic polyisocyanate can be or include a trimer, such as a trimer of IPDI, a trimer of 2,4-diisocyanato-dicyclohexyl-methane, a trimer of 4,4' diisocyanato-dicyclohexyl-methane, a trimer of IMCI, a trimer of CHDI, or a combination thereof. In other examples, the second cycloaliphatic polyisocyanate can be or include a biuret, such as a biuret of IPDI, a biuret of 2,4-diisocyanato-dicyclohexyl-methane, a biuret of 4,4' diisocyanato-dicyclohexyl-methane, a biuret of IMCI, a biuret of CHDI, or a combination thereof. In still additional examples, the second cycloaliphatic polyisocyanate can be or include an allophanate, such as an allophanate of IPDI, an allophanate of 2,4-diisocyanato-dicyclohexyl-methane, an allophanate of 4,4' diisocyanato-dicyclohexyl-methane, an allophanate of IMCI, an allophanate of CHDI, or a combination thereof.

In some specific examples, the second cycloaliphatic polyisocyanate can be or include an IPDI polyisocyanate. Where this is the case, in some examples, the IPDI polyisocyanate can be or include an IPDI trimer, an IPDI allophanate, or a combination thereof. In some additional examples, the IPDI polyisocyanate can include an allophanate of an IPDI trimer. In some other examples, the IPDI polyisocyanate can include an IPDI trimer, but not an allophanate.

In some examples, the second cycloaliphatic polyisocyanate can be or include the same cycloaliphatic polyisocyanate as the first cycloaliphatic polyisocyanate. In other examples, the second cycloaliphatic polyisocyanate can be or include a different cycloaliphatic polyisocyanate from the first cycloaliphatic polyisocyanate.

A variety of isocyanate-reactive materials can be combined with the second cycloaliphatic polyisocyanate and allowed to react to produce the isocyanate-terminated reaction product. For example, the isocyanate-reactive material can generally include a polyol or polyamine that is based on a polyether, a polyester, a polycarbonate, a polycarbonate ester, a polycaprolactone, a polybutadiene, the like, or a combination thereof. In some specific examples, the isocyanate-reactive material can include a polyether polyol. In some additional specific examples, the isocyanate-reactive material can include a polyester polyol. Additionally, the isocyanate-reactive material can generally have a number average molecular weight of from 300 g/mol to 6000 g/mol.

Examples of polyether polyols can be formed from the oxyalkylation of various polyols, for example, glycols such as ethylene glycol, 1,2-1,3- or 1,4-butanediol, 1,6-hexanediol, and the like, or higher polyols, such as trimethylol propane, pentaerythritol and the like. One commonly utilized oxyalkylation method is by reacting a polyol with an alkylene oxide, for example, ethylene oxide or propylene oxide in the presence of a basic catalyst or a coordination catalyst such as a double-metal cyanide (DMC).

Examples of suitable polyester polyols can be prepared by the polyesterification of organic polycarboxylic acids, anhydrides thereof, or esters thereof with organic polyols. Preferably, the polycarboxylic acids and polyols are aliphatic or aromatic dibasic acids and diols.

The diols which may be employed in making the polyester include alkylene glycols, such as ethylene glycol, 1,2-1,3- or 1,4-butanediol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher polyols can include, for example, trimethylol propane, trimethylol ethane, pentaerythritol, and the like, as well as higher molecular weight polyols such as those produced by oxyalkylating low molecular weight polyols.

The acid component of the polyester can include primarily monomeric carboxylic acids, or anhydrides thereof, or esters thereof having 2 to 18 carbon atoms per molecule. Among the acids that are useful are phthalic acid, isophthalic acid, terephthalic acid, tetrahydrophthalic acid, hexahydrophthalic acid, adipic acid, succinic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid.

In addition to polyester polyols formed from polybasic acids and polyols, polycaprolactone-type polyesters can also be employed. These products are formed from the reaction of a cyclic lactone such as ε-caprolactone with a polyol containing primary hydroxyls such as those mentioned above. Such products are described in U.S. Pat. No. 3,169,949, which is incorporated herein by reference.

Suitable hydroxy-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

In other examples, low molecular weight diols, triols, and higher alcohols may be included in the isocyanate-reactive material. In many embodiments, they can be monomeric and have hydroxyl values of 375 to 1810. Such materials can include aliphatic polyols, particularly alkylene polyols containing from 2 to 18 carbon atoms. Examples include ethylene glycol, 1,4-butanediol, 1,6-hexanediol, and cycloaliphatic polyols such as cyclohexane dimethanol. Examples of triols and higher alcohols include trimethylol propane and pentaerythritol. Also useful are polyols containing ether linkages such as diethylene glycol and triethylene glycol.

Thus, the isocyanate-terminated reaction product can be prepared from a variety of materials. Additionally, the isocyanate-terminated reaction product can generally have a Tg of less than −30° C. based on a Differential Scanning calorimetry reheat ($2^{nd}$ Heating) from −100° C. to 150° C. using 20° C./min heating and cooling ramps. In still additional examples, the isocyanate-terminated reaction product can have a Tg of less than −35° C., less than −40° C., or less than −45° C. based on a Differential Scanning calorimetry reheat (2nd Heating) from −100° C. to 150° C. using 20° C./min heating and cooling ramps.

The isocyanate-terminated reaction product can also generally have a number average isocyanate functionality of from 1.8 to 2.8 based on gel permeation chromatography using polystyrene standards. In some additional examples, the isocyanate-terminated reaction product can have a number average isocyanate functionality of from 1.8 to 2.2, from 2.0 to 2.4, from 2.2 to 2.6, or from 2.4 to 2.8 based on gel permeation chromatography using polystyrene standards.

In still additional examples, the isocyanate-terminated reaction product can have a variety of NCO contents. In some examples, the isocyanate-terminated reaction product can have an NCO % of from 2 wt % to 14 wt % based on ISO 11909:2007. In other examples, the isocyanate-terminated reaction product can have an NCO % of from 2 wt % to 6 wt %, from 4 wt % to 10 wt %, or from 8 wt % to 14 wt % based on ISO 11909:2007. In some specific examples, the isocyanate-terminated reaction product can have an NCO % of from 2.5 wt % to 4 wt % based on ISO 11909:2007.

In some additional examples, the flexibilizing component can also include a linear aliphatic polyisocyanate. As used herein, "linear aliphatic polyisocyanate" refers to a polyisocyanate that is prepared from or based on a linear isocyanate monomer, such as 1,4-tetramethylene diisocyanate, 1,5-pentamethylene diisocyanate, or 1,6-hexamethylene diisocyanate. Thus, for example, while the structure of a trimer of 1,6-hexamethylene diisocyanate may not be entirely linear, it is based on the linear monomeric 1,6-hexamethylene diisocyanate and is therefore considered a "linear aliphatic polyisocyanate" for the purposes of this disclosure. Non-limiting examples of linear aliphatic polyisocyanates can include 1,4-tetramethylene diisocyanate, 1,5-pentamethylene diisocyanate (PDI), 1,6-hexamethylene diisocyanate (HDI), a trimer of HDI, a trimer of PDI, a biuret of HDI, a biuret of PDI, an allophanate of HDI, an allophanate of PDI, an allophanate of a trimer of HDI, an allophanate of a trimer of PDI, 2,2,4-trimethyl-hexamethylene diisocyanate, 2,4,4-trimethyl-hexamethylene diisocyanate, dodecamethylene diisocyanate, 2-methyl-1,5-diisocyanatopentane, the like, or a combination thereof.

In some specific examples, the linear aliphatic polyisocyanate can be or include an HDI polyisocyanate. In some additional specific examples, the linear aliphatic polyisocyanate can be or include a PDI polyisocyanate. In some specific examples, the linear aliphatic polyisocyanate can be or include a biuret, such as a biuret of HDI, a biuret of PDI, or a combination thereof. In some additional specific examples, the linear aliphatic polyisocyanate can be or include a trimer, such as a trimer of HDI, a trimer of PDI, or a combination thereof. In still further specific examples, the linear aliphatic polyisocyanate can be or include an allophanate, such as an allophanate of HDI, an allophanate of PDI, an allophanate of a trimer of HDI, an allophanate of a trimer of PDI, or a combination thereof.

The linear aliphatic polyisocyanate can generally have a relatively low number average isocyanate functionality to reduce the crosslinking density and provide a resin with greater flexibility. In some examples, the linear aliphatic polyisocyanate can have a number average isocyanate functionality of from 2 to 3 based on gel permeation chromatography with polystyrene standards. In some specific examples, the linear aliphatic polyisocyanate can have a number average isocyanate functionality of from 2.0 to 2.5, from 2.3 to 2.8, or from 2.5 to 3.0 based on gel permeation chromatography using polystyrene standards.

In some examples, the linear aliphatic polyisocyanate can have an NCO % of from 15 wt % to 25 wt % based on ISO 11909:2007. In some specific examples, the linear aliphatic polyisocyanate can have an NCO % of from 15 wt % to 20 wt %, from 18 wt % to 22 wt %, or from 20 wt % to 25 wt % based on ISO 11909:2007.

In some examples, the flexibilizing component can include the isocyanate-terminated reaction product. In some additional examples, the flexibilizing component can include the linear aliphatic polyisocyanate. In still additional examples, the flexibilizing component can include both the isocyanate-terminated reaction product and the linear aliphatic polyisocyanate.

Where the flexibilizing component includes both the isocyanate-terminated reaction product and the linear aliphatic polyisocyanate, the isocyanate-terminated reaction product and the linear aliphatic polyisocyanate are generally included at a weight ratio of from 0.5 to 3.0 reaction product/linear aliphatic polyisocyanate. In other examples, the isocyanate-terminated reaction product and the linear aliphatic polyisocyanate can be included in the polyisocyanate resin at a weight ratio of from 0.5 to 1.5, from 1.0 to 2.0, from 1.5 to 2.5, or from 2.0 to 3.0.

Thus, the polyisocyanate resin can include a variety of aliphatic polyisocyanates. Generally, the polyisocyanate resin does not include an aromatic polyisocyanate. In some examples, the polyisocyanate resin includes less than 5 wt %, less than 1 wt %, less than 0.1 wt %, or less than 0.01 wt % of an aromatic polyisocyanate.

In some examples, the polyisocyanate resin is not diluted in a solvent and has 100 wt % solids based on a total weight of the polyisocyanate resin. In some other examples, the polyisocyanate resin can be diluted in a solvent to form a polyisocyanate composition. A variety of solvents can be used to dilute the polyisocyanate resin and reduce the viscosity thereof. Non-limiting examples of solvents that can be employed in the polyisocyanate composition can include ethyl acetate, butyl acetate, 1-methoxy propyl-acetate-2, acetone, methyl ethyl ketone, methyl isobutyl ketone, cyclohexanone, toluene, xylene, solvent naphtha, the like, or a combination thereof. In some specific examples, the solvent can include butyl acetate, methyl ethyl ketone, methoxypropylacetate, or a combination thereof.

In some examples, the polyisocyanate resin can be diluted in solvent to prepare a polyisocyanate composition having a solids content of from 80 wt % solids to 99 wt % solids based on a total weight of the polyisocyanate composition. In other examples, the polyisocyanate resin can be diluted in solve to prepare a polyisocyanate composition having a solids content of from 85 wt % to 95 wt %, from 86 wt % to 94 wt %, or from 87 wt % to 93 wt % based on a total weight of the polyisocyanate composition.

In some examples, the polyisocyanate resin or polyisocyanate composition can have a viscosity of from 500 mPas to 1300 MPas at 25° C. based on ISO 3219/A.3. In some additional examples, the polyisocyanate resin or polyisocyanate composition can have a viscosity of from 600 mPas to 1200 MPas, or from 700 mPas to 1100 MPas at 25° C. based on ISO 3219/A.3.

In some additional examples, the polyisocyanate resin or polyisocyanate composition can have an NCO % of from 8 wt % to 16 wt % based on ISO 11909:2007. In other examples, the polyisocyanate resin can have an NCO % of from 8 wt % to 12 wt %, from 10 wt % to 14 wt % or from 12 wt % to 16 wt % based on ISO 11909:2007.

In still additional examples, the polyisocyanate resin or polyisocyanate composition can include less than 1 wt % polyisocyanate monomer based on a total weight of the polyisocyanate resin or polyisocyanate composition. In still additional examples, the polyisocyanate resin or polyisocyanate composition can include less than 0.8 wt %, less than 0.7 wt %, or less than 0.6 wt % polyisocyanate monomer based on a total weight of the polyisocyanate resin or polyisocyanate composition.

The present disclosure also describes methods of manufacturing polyisocyanate resins. The methods can include combining a first cycloaliphatic polyisocyanate as described herein and a flexibilizing component as described herein at a weight ratio of from 0.3 to 1 first cycloaliphatic polyisocyanate/flexibilizing component. In some additional examples, the first cycloaliphatic polyisocyanate and the flexibilizing component can be combined at a weight ratio of from 0.3 to 0.7, from 0.4 to 0.8, from 0.5 to 0.9, or from 0.6 to 1 first cycloaliphatic polyisocyanate/flexibilizing component.

In some specific examples, the first cycloaliphatic polyisocyanate can have an NCO % of from 12 wt % to 20 wt % based on ISO 11909:2007. In additional specific examples, the flexibilizing component can include an isocyanate-terminated reaction product of a second cycloaliphatic polyisocyanate and an isocyanate reactive material as well as a linear aliphatic polyisocyanate. Where this is the case, the isocyanate-terminated reaction product and the linear aliphatic polyisocyanate can be combined at a weight ratio of from 0.5 to 2.5.

Combining the first cycloaliphatic polyisocyanate and the flexibilizing component can be performed in a variety of ways. In some examples, the first cycloaliphatic polyisocyanate and the flexibilizing component can be combined by reacting individual components to form an isocyanate-terminated prepolymer. In other examples, the first cycloaliphatic polyisocyanate and the flexibilizing component may be combined by mixing to form a blend.

Similarly, in some examples, combining individual constituents of the flexibilizing component can be performed by reacting the individual components together to form a prepolymer. In other examples, individual constituents of the flexibilizing component may be combined by mixing to form a blend.

In some additional examples, a solvent can be used to dilute the resin or one or more individual resin components to reduce the viscosity thereof to facilitate the reaction and/or mixing process. A variety of solvents, such as those described elsewhere herein, can be used as diluents. In other examples, one or more constituents of the polyisocyanate resin can have a sufficiently low viscosity to act as a reactive diluent without using any additional diluents.

The polyisocyanate resin described herein, or the polyisocyanate composition where diluted with a solvent, can be part of a two-component (2K) polyurea or polyurethane coating system. Thus, the present disclosure also describes a 2K coating system including a polyisocyanate resin as described herein, or polyisocyanate composition, and a polyaspartate composition or other isocyanate-reactive composition. The present disclosure also describes a polyurea or polyurethane coating composition including a mixture and/or reaction product of the polyisocyanate resin as described herein and a polyaspartate composition or other isocyanate-reactive composition at an equivalent ratio of from 1:1 to 1.2:1 NCO:NH or NCO:OH. In some additional examples, the polyisocyanate composition can be combined with the polyaspartate composition or other isocyanate-reactive composition at an equivalent ratio of from 1:1 to 1.06:1, from 1.04:1 to 1.1:1, or from 1.1:1 to 1.2:1 NCO:NH or NCO:OH.

In some specific examples, the polyisocyanate resin can be combined with a polyaspartate composition to produce a coating composition. In further detail, polyaspartates may be produced by the reaction of a polyamine with a Michael addition receptor, i.e., an olefin substituted on one or both of the olefinic carbons with an electron withdrawing group such as cyano, keto or ester (an electrophile) in a Michael addition reaction. Examples of suitable Michael addition receptors include, but are not limited to, acrylates, and diesters such as dimethyl maleate, diethyl maleate, dibutyl maleate, dimethyl fumarate, diethyl fumarate, and dibutyl fumarate.

Additionally, the polyaspartate can be prepared with a variety of polyamines, including low molecular weight diamines, high molecular weight diamines, or a combination thereof. Additionally, the polyamines can have a wide range of amine functionality, repeat unit type, distribution, etc. This wide range of molecular weight, amine functionality, repeating unit type, and distribution can provide versatility in the design of new compounds or mixtures.

Suitable low molecular weight diamines have molecular weights in various embodiments of from 60 to 400, in selected embodiments of from 60 to 300. Suitable low-molecular-weight diamines include, but are not limited to, ethylene diamine, 1,2- and 1,3-diaminopropane, 1,5-diaminopentane, 1,3-, 1,4- and 1,6-diaminohexane, 1,3-diamino-2,2-dimethyl propane, 2-methylpentamethylenediamine, isophorone diamine, 4,4'-diamino-dicyclohexyl methane, 4,4-diamino-3,3'-dimethyldicyclohexyl methane, 1,4-bis(2-amino-prop-2-yl)-cyclohexane, hydrazine, piperazine, bis(4-aminocyclohexyl)methane, and and mixtures of such diamines. Representative polyaspartates prepared from these low molecular weight diamines include DESMO-PHEN NH-1220, DESMOPHEN NH-1420, and DESMOPHEN NH-1520, commercially available from COVESTRO.

In some additional embodiments of the invention, a single high molecular weight polyamine may be used. Also, mixtures of high molecular weight polyamines, such as mixtures of di- and trifunctional materials and/or different molecular weight or different chemical composition materials, may be used. The term "high molecular weight" is intended to include polyamines having a molecular weight of at least 400 in various embodiments. In selected embodiments, the polyamines have a molecular weight of from 400 to 6,000. Non-limiting examples can include polyethylene glycol bis (amine), polypropylene glycol bis(2-aminopropyl ether), the like, or a combination thereof.

In some specific examples, the polyamine can be an amine-terminated polyether. Commercially available examples of amine-terminated polyethers include, for example, the JEFFAMINE series of amine-terminated polyethers from Huntsman Corp., such as, JEFFAMINE D-230, JEFFAMINE D-400, JEFFAMINE D-2000, JEFFAMINE D-4000, JEFFAMINE T-3000 and JEFFAMINE T-5000.

In some examples, the polyaspartate may include one or more polyaspartates corresponding to formula (I):

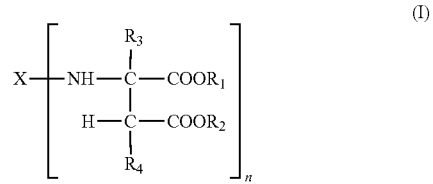

wherein:

n is an integer of at least 2;

X represents an aliphatic residue;

$R_1$ and $R_2$ independently of each other represent organic groups that are inert to isocyanate groups under reaction conditions; and $R_3$ and $R_4$ independently of each other represent hydrogen or organic groups that are inert to isocyanate groups under reaction conditions.

In some additional examples, n has a value of from 2 to 6. In still additional examples, n has a value of from 2 to 4. In still additional examples, n has a value of 2.

In some examples, X represents an organic group that has a valency of n and is inert towards isocyanate groups at a temperature of 100° C. or less. In some additional examples, X represents a group obtained by removing amino groups from an aliphatic, araliphatic, or cycloaliphatic polyamine.

In some examples, $R_1$ and $R_2$ independently represent an alkyl group having from 1 to 9 carbon atoms. In some specific examples, $R_1$ and $R_2$ independently represent a methyl, ethyl, or butyl group. In still additional examples, $R_1$ and $R_2$, together form a cycloaliphatic or heterocyclic ring.

Other isocyanate-reactive compositions can also be combined with the polyisocyanate resins described herein. Other isocyanate-reactive compositions can generally include a polyol or a polyamine that is based on a polyether, a polyester, a polycarbonate, a polycarbonate ester, a polycaprolactone, a polybutadiene, the like, or a combination thereof, such as those described elsewhere herein. In some further examples, the isocyanate-reactive composition can include such a polyol or polyamine having a number average molecular weight of from 300 g/mol to 10,000 g/mol, from 400 g/mol to 6000 g/mol, or from 600 g/mol to 4000 g/mol.

It is further noted that the polyisocyanate resin or composition, the polyaspartate composition, the other isocyanate-reactive composition, or a combination thereof can optionally include one or more additives. Non-limiting examples of additives can include a dispersant, a flow aid, a surfactant, a thickener, a colorant, a solvent, a leveling agent, the like, or a combination thereof.

Thus, the polyisocyanate resin or composition can be combined with a polyaspartate composition or other isocyanate-reactive composition to form a coating composition. The coating composition can be coated on a surface portion of a variety of substrates. Non-limiting examples of substrates can include metals, plastics, wood, cement, concrete, glass, the like, or a combination thereof.

In further detail, the coating composition can be applied by spraying, knife coating, curtain coating, vacuum coating, rolling, pouring, dipping, spin coating, squeegeeing, brushing, squirting, printing, the like, or a combination thereof. Printing techniques can include screen, gravure, flexographic, or offset printing and also various transfer methods.

The coating composition can be applied to a portion of a substrate at a variety of coating thicknesses (e.g., wet film thicknesses). For example, in some cases, the coating composition can be applied to a surface portion of a substrate at a coating thickness of from 1 thousandth of an inch (mil) to 16 mils. In other examples, the coating composition can be applied to a surface portion of a substrate at a coating thickness of from 1 mil to 5 mils, from 3 mils to 9 mils, from 6 mils to 12 mils, or from 10 mils to 16 mils.

In some specific examples, the coating composition can be coated on a surface portion of a substrate and cured to form a polyurea coating. In some examples, the polyurea coating can have relatively stable gloss values over a period of at least 4 weeks. For example, in some cases, the polyurea coating can have a change in 60° gloss values of less than or equal to 9 gloss units from 4 hours to 4 weeks after applying the coating composition to the surface portion based on ASTM D523 and storage conditions of 75° F. and relative humidity of 55%. In some additional examples, the polyurea coating can have a change in 60° gloss values of less than or equal to 7, 6, or 5 gloss units from 4 hours to 4 weeks after applying the coating composition to the surface portion based on ASTM D523 and storage conditions of 75° F. and relative humidity of 55%.

In some additional examples, the polyurea coating can have a change in 60° gloss values of less than or equal to 20 gloss units from 1 hour to 4 weeks after applying the coating composition to the surface portion based on ASTM D523 and initial storage conditions of 120° F. and relative humidity of 80% for a period of 30 minutes followed by subsequent storage conditions of 104° F. and relative humidity of 80% for a remainder of the 4 week testing period. In still additional examples, the polyurea coating can have a change in 60° gloss values of less than or equal to 15, 12, or 7 gloss units from 1 hour to 4 weeks after applying the coating composition to the surface portion based on ASTM D523 and initial storage conditions of 120° F. and relative humidity of 80% for a period of 30 minutes followed by subsequent storage conditions of 104° F. and relative humidity of 80% for a remainder of the 4 week testing period.

Additionally, in some examples, the polyurea coating can have deformation resistance of at least 30 inch-pounds (in-lbs) 4 weeks after applying the coating composition to the surface portion based on ASTM D523 and initial storage conditions of 120° F. and relative humidity of 80% for a period of 30 minutes followed by subsequent storage conditions of 104° F. and relative humidity of 80% for a remainder of the 4 week testing period. In some further examples, the polyurea coating can have deformation resistance of at least 35, 40, or 45 inch-pounds (in-lbs) 4 weeks after applying the coating composition to the surface portion based on ASTM D523 and initial storage conditions of 120° F. and relative humidity of 80% for a period of 30 minutes followed by subsequent storage conditions of 104° F. and relative humidity of 80% for a remainder of the 4 week testing period.

Examples

Materials used in the examples:

| | |
|---|---|
| Polyaspartate A | a 100% solids content aspartic ester functional amine, having an amine number of 200 mg KOH/g, viscosity @ 25° C. of 1100-1500 mPa · s. |
| Polyaspartate B | a 100% solids content aspartic ester functional amine, having an amine number of 190 mg KOH/g, viscosity @ 25° C. of 1000-1800 mPa · s. |
| Polyisocyanate A | a cycloaliphatic polyisocyanate based on IPDI and having an NCO % of from 10%-11% based on ISO 11909: 2007 and a number average isocyanate functionality of from 2.4-3.0 based on gel permeation chromatography. |
| Polyisocyanate B | a cycloaliphatic polyisocyanate based on IPDI having an NCO % of from 10%-11% based on ISO 11909: 2007 and a number average isocyanate functionality of from 3.3-3.8 based on gel permeation chromatography. |
| Polyisocyanate C | an aliphatic polyisocyanate based on HDI and having an NCO % of from 10%-12% based on ISO 11909: 2007, a number average isocyanate functionality of from 3.5-4.0 based on gel permeation chromatography, and a Tg of −2° C. based on a Differential Scanning Calorimetry reheat ($2^{nd}$ Heating) from −100° C. to 150° C. using 20° C./min heating and cooling ramps. |
| Polyisocyanate D | an aliphatic polyisocyanate based on a reaction product of HDI and a polyether polyol having an NCO % of 6% based on ISO 11909: 2007, a number average functionality of 4 based on gel permeation chromatography, and a Tg of −53° C. based on a Differential Scanning Calorimetry reheat ($2^{nd}$ Heating) from −100° C. to 150° C. using 20° C./min heating and cooling ramps. |
| Polyisocyanate E | a reaction product of a cycloaliphatic polyisocyanate based on IPDI and a polycarbonate polyol having an NCO % of from 2%-5% based on ISO 11909: 2007, a number average functionality |

-continued

|  |  |
|---|---|
|  | of 2 based on gel permeation chromatography, and a Tg of −45° C. based on a Differential Scanning Calorimetry reheat (2$^{nd}$ Heating) from −100° C. to 150° C. using 20° C./min heating and cooling ramps. |
| Polyisocyanate F | is a reaction product of a cycloaliphatic polyisocyanate based on IPDI and a polyether polyol having an NCO % of from 2%-5% based on ISO 11909: 2007, a number average functionality of 2 based on gel permeation chromatography, and a Tg of −50° C. based on a Differential Scanning Calorimetry reheat (2$^{nd}$ Heating) from −100° C. to 150° C. using 20° C./min heating and cooling ramps. |
| Polyisocyanate G | aliphatic polyisocyanate based on allophanated HDI trimer having an NCO % of 20 wt % based on ISO 11909: 2007, a number average functionality of 2.5 based on gel permeation chromatography, and a Tg of 51° C. based on a Differential Scanning Calorimetry reheat (2$^{nd}$ Heating) from −100° C. to 150° C. using 20° C./min heating and cooling ramps. |
| Polyisocyanate H | an aliphatic polyisocyanate based on HDI having an NCO % of from 2%-5% based on ISO 11909: 2007, a number average functionality of 2 based on gel permeation chromatography, and a Tg of 88° C. based on a Differential Scanning Calorimetry reheat (2$^{nd}$ Heating) from −100° C. to 150° C. using 20° C./min heating and cooling ramps. |

Various polyisocyanate resins were prepared for combination with a polyaspartate composition in an effort to achieve corrosion-resistant coatings with stable gloss properties and good flexibility. Gloss properties were measured as a change in 60° gloss value over a period of 4 weeks after application of the coating. Gloss values were measured according to ASTM D523. Flexibility was measured at 4 weeks after application of the coating via deformation resistance testing based on ASTM D2794. 60° gloss values were determined under each of two separate sets of conditions. Standard conditions included storing the coating at 75° F. and 55% relative humidity for a period of 4 weeks. Accelerated conditions were performed at 80% relative humidity with an initial heating period of 120° F. for 30 minutes, followed by a subsequent storage temperature of 104° F. for the remainder of the 4 weeks. Deformation resistance values were determined only under accelerated conditions. Suitable coating compositions were considered to be those that achieved a change in 60° gloss value of less than or equal to 9 gloss units under standard storage conditions, a change in 60° gloss value of less than or equal to 20 gloss units under accelerated storage conditions, and deformation resistance values of greater than or equal to 30 inch-pounds under accelerated storage conditions.

The various example polyisocyanate resins were prepared using Polyisocyanates A-H. Table 1 presents each of the example polyisocyanate resins and the corresponding weight percentages of Polyisocyanates A-H that were combined together to prepare the example polyisocyanate resins.

TABLE 1

Polyisocyanate Resins

| Resin ID | A % | B % | C % | D % | E % | F % | G % | H % |
|---|---|---|---|---|---|---|---|---|
| Comparative Resin 1 | 100 |  |  |  |  |  |  |  |
| Comparative Resin 2 |  | 60 | 40 |  |  |  |  |  |
| Comparative Resin 3 | 88 |  | 12 |  |  |  |  |  |
| Comparative Resin 4 |  | 60 | 20 | 20 |  |  |  |  |
| Comparative Resin 5 |  | 60 | 30 | 10 |  |  |  |  |
| Comparative Resin 6 |  |  |  | 40 |  |  | 60 |  |
| Comparative Resin 7 |  |  |  | 60 |  |  | 40 |  |
| Comparative Resin 8 |  |  |  | 50 |  |  |  | 50 |
| Comparative Resin 9 |  |  |  | 40 |  |  |  | 60 |
| Comparative Resin 10 |  |  |  | 60 |  |  |  | 40 |
| Comparative Resin 11 |  |  |  | 20 |  |  |  | 80 |
| Comparative Resin 12 |  | 50 |  | 30 |  |  | 20 |  |
| Comparative Resin 13 |  | 50 |  |  |  | 30 | 20 |  |
| Inventive Resin 1 |  | 40 |  | 40 |  |  | 20 |  |
| Inventive Resin 2 |  | 40 |  |  |  | 40 | 20 |  |
| Inventive Resin 3 |  | 30 |  | 40 |  |  | 30 |  |
| Inventive Resin 4 |  | 30 |  |  |  | 40 | 30 |  |
| Inventive Resin 5 |  | 30 |  |  |  | 50 | 20 |  |
| Inventive Resin 6 |  | 30 |  | 30 |  |  | 40 |  |
| Inventive Resin 7 |  | 30 |  |  |  | 30 | 40 |  |
| Inventive Resin 8 |  | 45 |  | 30 |  |  | 25 |  |
| Inventive Resin 9 |  | 45 |  |  |  | 30 | 25 |  |
| Inventive Resin 10 |  | 47 |  | 34 |  |  | 19 |  |
| Inventive Resin 11 |  | 35 |  |  |  | 45 | 20 |  |
| Inventive Resin 12 |  | 35 |  |  |  | 45 | 20 |  |
| Inventive Resin 13 |  | 39 |  |  |  | 39 | 22 |  |

Each of the resins presented in Table 1 was combined with a 70:30 blend of Polyaspartate A:Polyaspartate B at an index of 1.05 NCO/NH to prepare respective coating compositions. For gloss measurements, the individual coating compositions were applied to 4×8 inch sandblasted steel panels with a 1-2 mil profile (SSPC SP-10) at a wet film thickness of 8-10 mils. For impact resistance, the individual coating compositions were applied to 4×12 B952 P99X steel panels at a wet film thickness of 8-10 mils. The coatings were then stored under the standard and accelerated conditions described above. The 60° gloss values and deformation resistance values for coatings based on the individual resins described above are presented below in Table 2.

TABLE 2

Results

| Resin ID | Δ °60 Gloss (Standard) | Δ °60 Gloss (Accelerated) | Deformation Resistance (In-Lbs) |
|---|---|---|---|
| Comparative Resin 1 | 6.3 | 11 | 20 |
| Comparative Resin 2 | 4.9 | 6.7 | 25 |
| Comparative Resin 3 | 9.8 | 18.3 | 30 |
| Comparative Resin 4 | 3.6 | 6.1 | 25 |
| Comparative Resin 5 | 3.5 | 6.7 | 25 |
| Comparative Resin 6 | 22.3 | 25.9 | 160 |
| Comparative Resin 7 | 24 | 26 | 140 |
| Comparative Resin 8 | 15.4 | 22.1 | 120 |
| Comparative Resin 9 | 15.6 | 17.3 | 160 |
| Comparative Resin 10 | 12.8 | 22.6 | 60 |
| Comparative Resin 11 | 5.8 | 25.3 | 55 |
| Comparative Resin 12 | 7.8 | 7.5 | 25 |
| Comparative Resin 13 | 5.6 | 5.9 | 20 |
| Inventive Resin 1 | 4.6 | 15.6 | 40 |
| Inventive Resin 2 | 7 | 9 | 30 |
| Inventive Resin 3 | 8.9 | 19.2 | 55 |
| Inventive Resin 4 | 9 | 15.2 | 60 |
| Inventive Resin 5 | 8.6 | 10.5 | 55 |
| Inventive Resin 6 | 3.5 | 19 | 50 |
| Inventive Resin 7 | 3.3 | 10.8 | 45 |
| Inventive Resin 8 | 3.8 | 5.6 | 30 |
| Inventive Resin 9 | 0.6 | 4.9 | 30 |
| Inventive Resin 10 | 3 | 4.8 | 30 |
| Inventive Resin 11 | 4.3 | 8.3 | 35 |
| Inventive Resin 12 | 7.1 | 16.3 | 35 |
| Inventive Resin 13 | 4.5 | 5.9 | 35 |

As can be seen from the results presented in Table 2, each of the inventive resins was suitable to prepare a coating having a change in 60° gloss value of less than or equal to 9 gloss units under standard storage conditions, a change in 60° gloss value of less than or equal to 20 gloss units under accelerated storage conditions, and deformation resistance values of greater than or equal to 30 inch-pounds under accelerated storage conditions. Further, in some cases, the inventive examples were able to exceed these threshold parameters by a considerable margin in at least one, if not all, categories.

In contrast, the comparative resins did not meet each of these parameters. In some cases, one or more of the comparative examples were able to achieve one or more suitable gloss parameters, but were not able to achieve suitable deformation resistance values. In some other cases, one or more of the comparative examples were able to achieve suitable deformation resistance values, but were not able to achieve one or more suitable gloss parameters.

It should be understood that the above-described examples are only illustrative of some embodiments of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that variations including, may be made without departing from the principles and concepts set forth herein.

What is claimed is:

1. A polyisocyanate resin, comprising:
   from 25 wt % to 50 wt %, based on a total weight of the polyisocyanate resin, of a first cycloaliphatic polyisocyanate; and
   from 50 wt % to 75 wt %, based on a total weight of the polyisocyanate resin, of a flexibilizing component, comprising
   an isocyanate-terminated reaction product of a second cycloaliphatic polyisocyanate and an isocyanate-reactive material, the isocyanate-terminated reaction product having a Tg of less than −30° C. based on a Differential Scanning calorimetry ($2^{nd}$ Heating) temperature scan from −100° C. to 150° C. using 20° C./min heating and cooling ramps, and
   a linear aliphatic polyisocyanate having a number average isocyanate functionality of from 2 to 3 based on gel permeation chromatography,
   wherein the isocyanate-terminated reaction product and the linear aliphatic polyisocyanate are present at a weight ratio of from 0.5 to 3.

2. The polyisocyanate resin of claim 1, wherein the first cycloaliphatic polyisocyanate has a number average isocyanate functionality of from 2.4 to 3.8.

3. The polyisocyanate resin of claim 1, wherein the first cycloaliphatic polyisocyanate comprises an IPDI polyisocyanate.

4. The polyisocyanate resin of claim 3, wherein the IPDI polyisocyanate comprises an IPDI trimer, an IPDI allophanate, or a combination thereof.

5. The polyisocyanate resin of claim 1, wherein the isocyanate-terminated reaction product has a number average isocyanate functionality of from 1.8 to 2.8.

6. The polyisocyanate resin of claim 1, wherein the isocyanate-terminated reaction product has an NCO % of from 2 wt % to 14 wt % based on ISO 11909:2007.

7. The polyisocyanate resin of claim 1, wherein the second cycloaliphatic polyisocyanate comprises an IPDI polyisocyanate.

8. The polyisocyanate resin of claim 7, wherein the IPDI polyisocyanate comprises an IPDI trimer, an IPDI allophanate, or a combination thereof.

9. The polyisocyanate resin of claim 1, wherein the linear aliphatic polyisocyanate has an NCO % of from 15 wt % to 25 wt % based on ISO 11909:2007.

10. The polyisocyanate resin of claim 1, wherein linear aliphatic polyisocyanate comprises an HDI polyisocyanate, a PDI polyisocyanate, or a combination thereof.

11. The polyisocyanate resin of claim 1, wherein the linear aliphatic polyisocyanate comprises an allophanate.

12. The polyisocyanate resin of claim 1, wherein the polyisocyanate resin is diluted in a solvent to form a polyisocyanate composition having a total solids content of from 80 wt % to 99 wt % based on a total weight of the polyisocyanate composition.

13. The polyisocyanate resin of claim 12, wherein the solvent comprises ethyl acetate, butyl acetate, 1-methoxy propyl-acetate-2, acetone, methyl ethyl ketone, methyl isobutyl ketone, cyclohexanone, toluene, xylene, solvent naphtha, or a combination thereof.

14. The polyisocyanate resin of claim 12, wherein the polyisocyanate composition has a viscosity of from 500 mPas to 1300 mPas at 25° C. based on ISO 3219/A.3.

15. The polyisocyanate resin of claim 12, wherein the polyisocyanate composition has an NCO % of from 8 wt % to 16 wt % based on ISO 11909:2007.

16. A coating composition, comprising:
the polyisocyanate resin of claim 1; and
a polyaspartate composition,
wherein the polyisocyanate resin and the polyaspartate composition are combined at an NCO:NH equivalent ratio of from 1:1 to 1.2:1.

17. A polyurea coating, comprising:
the coating composition of claim 16 applied to a surface portion of a substrate at a coating thickness of from 1 mil to 16 mil.

18. The polyurea coating of claim 17, wherein the polyurea coating has a change in 60° gloss value of less than 7 gloss units from 4 hours to 4 weeks after applying the coating composition to the surface portion based on ASTM D523 and storage conditions of 75° F. and relative humidity of 55%.

19. The polyurea coating of claim 17, wherein the polyurea coating has a deformation resistance of at least 30 inch-pounds 4 weeks after applying the coating composition to the surface portion based on ASTM D2794 and initial storage conditions at 120° F. for and 80% relative humidity for 30 minutes and subsequent storage conditions of 104° F. and relative humidity of 80%.

20. A method of manufacturing a polyisocyanate resin, comprising:
combining a first cycloaliphatic polyisocyanate and a flexibilizing component at a weight ratio of from 0.3 to 1, wherein the flexibilizing component, comprises:
an isocyanate-terminated reaction product of a second cycloaliphatic polyisocyanate and an isocyanate-reactive material, the reaction product having a Tg of less than −30° C. based on a Differential Scanning calorimetry ($2^{nd}$ Heating) temperature scan from −100° ° C. to 150° C. using 20° C./min heating and cooling ramps, and
a linear aliphatic polyisocyanate having a number average isocyanate functionality of from 2 to 3 based on gel permeation chromatography,
wherein the isocyanate-terminated reaction product and the linear aliphatic polyisocyanate are combined at a weight ratio of from 0.5 to 3.

\* \* \* \* \*